2 Sheets—Sheet 1
F. MARSH.
Draft-Equalizer.
No. 225,709. Patented Mar. 23. 1880.
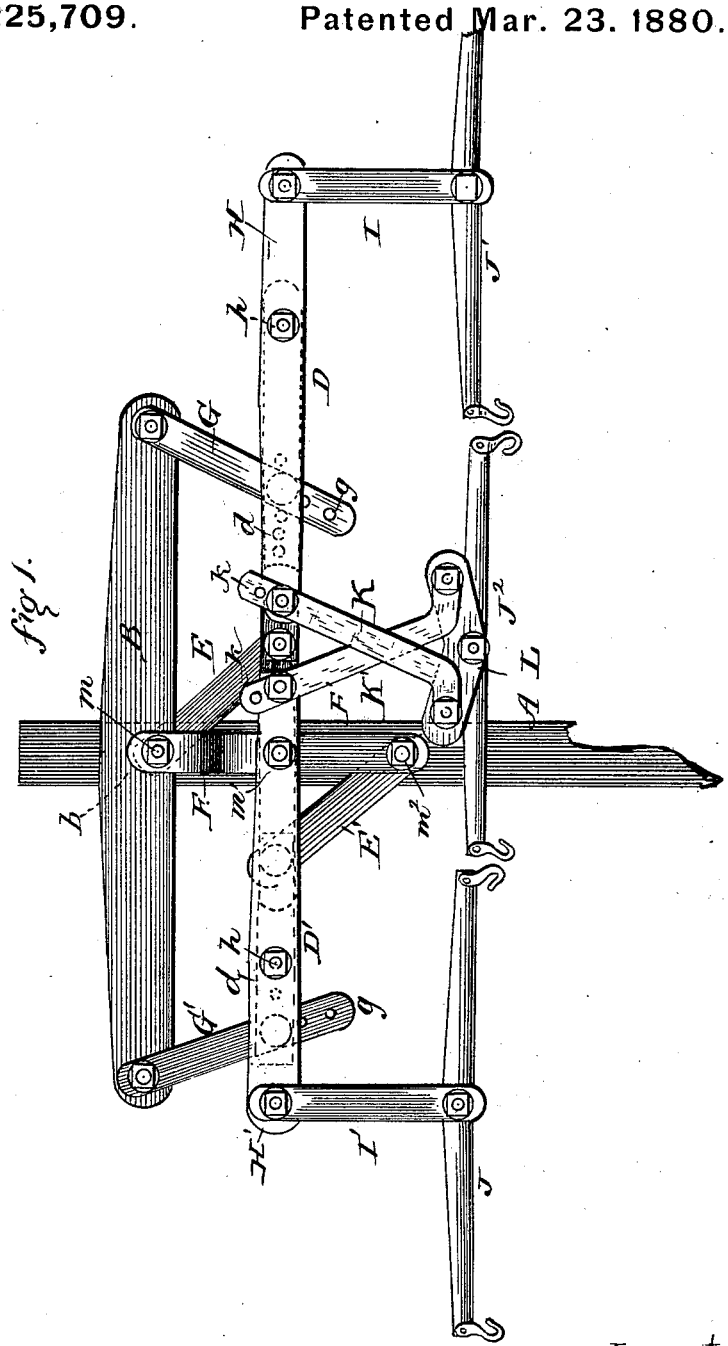
Witnesses
Fred G. Dieterich
B. L. Dieterich
Inventor
Franklin Marsh
by Atty
N. W. Fitzgerald F. MARSH.
Draft-Equalizer.
No. 225,709. Patented Mar. 23, 1880.
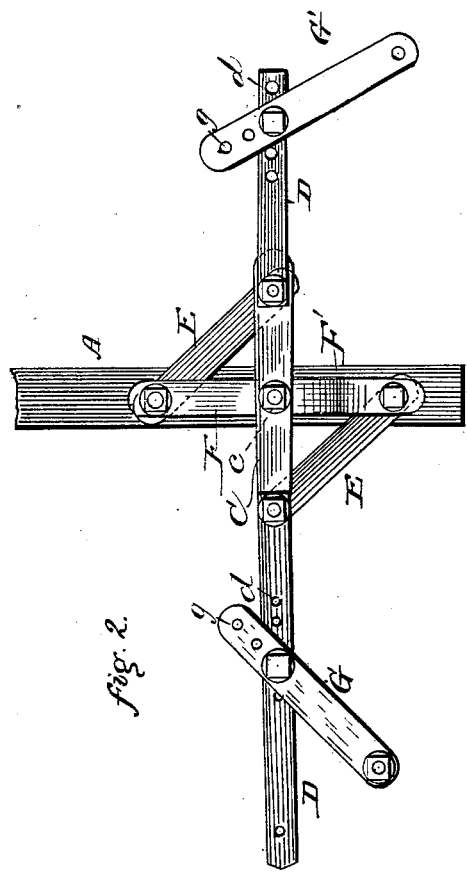
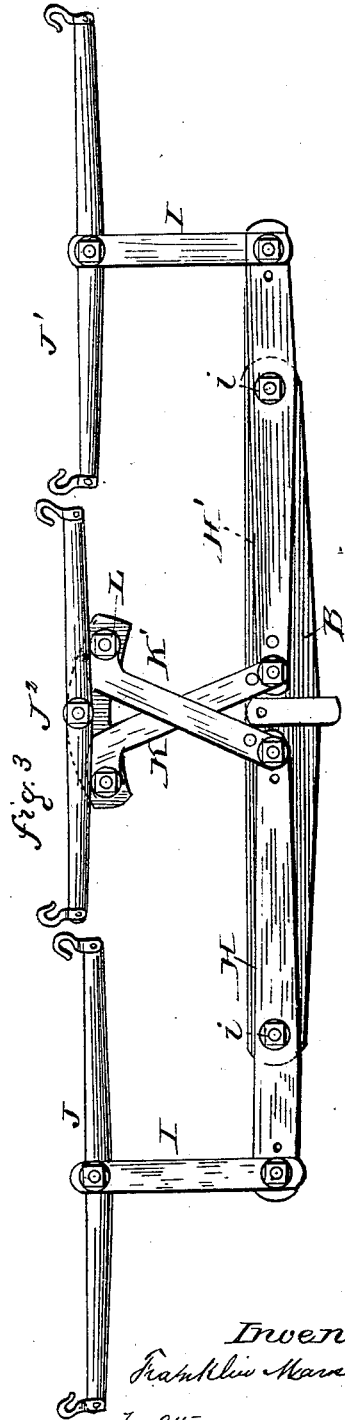

UNITED STATES PATENT OFFICE.

FRANKLIN MARSH, OF OSKALOOSA, IOWA.

DRAFT-EQUALIZER.

SPECIFICATION forming part of Letters Patent No. 225,709, dated March 23, 1880.

Application filed December 4, 1879.

*To all whom it may concern:*

Be it known that I, FRANKLIN MARSH, of Oskaloosa, in the county of Mahaska and State of Iowa, have invented certain new and useful Improvements in Draft-Equalizers; and I do hereby declare the following to be a full, clear, and exact description of the same, reference being made to the accompanying drawings, forming a part of this specification, and in which—

Figure 1 represents a top or plan view of my improved equalizer complete for pole or tongue. Fig. 2 represents a top or plan view of the evener. Fig. 3 represents a top or plan view of the equalizer when used without pole or tongue.

My invention relates to certain new and useful improvements in the class of draft-equalizers, having for its object the production of an equalizer to be used either with or without a pole or tongue, reversible for two horses on either side of the pole or tongue, and adjustable, so that advantage can be given anywhere necessary for light or heavy draft-horses, on or off the pole, for light or heavy side draft on pole, or to obviate side draft when necessary; and to this end the invention consists in the general construction, combination, and arrangement of parts, all as will be hereinafter fully described, and specifically pointed out in the claims.

To enable others skilled in the art to make and use my invention, I will now proceed to describe its construction and operation.

In the drawings, A represents the tongue; B, the main evener, centrally pivoted to the tongue at $b$; and C, a central cross-bar, pivoted at $c$ to the tongue, and projecting at right angles thereto, with its ends pivoted to the inner ends of the long and short levers D D', and the diagonal braces E E', arranged in front and rear of said cross-bar on opposite sides of the tongue, and to which their opposite ends are pivoted.

F F' represent front and rear strap-braces connecting the evener B and tongue A with the cross-bar C, and G G' represent strap-braces connecting the ends of the main evener B with the long and short levers D D', said levers and braces being provided with adjusting-holes $d\ g$. To the outer ends of the levers D D' are pivoted the supplemental equalizing-bars H H' at the points $h$.

I I' represent straps connecting the outer ends of the equalizing-bars with the outer single-trees J J'.

K K' represent angular cross-straps connecting the inner ends of the equalizing-bars with the ends of the plate L, constructed as shown, and to which the central single-tree, $J^2$, is centrally pivoted.

By means of the above-described arrangement of parts the draft of three horses is independently equalized with two horses on one side of tongue and one on the opposite side thereof, and with power of one and one-half horse on each side of the tongue with the draft by leverage to a common center; and by means of the adjusting-holes in the cross-straps K K', long and short levers D D', straps G G', and cross-bar C you can change the draft so as to have the power applied through the tongue to whatever you wish moved, and through the medium of said adjusting-holes you can increase or decrease the draft, as may be expedient.

You can contract the leverage from the side two horses are on by shifting equalizing-bar H to the right, so that strap-brace G may be connected to the outer end of bar H and strap-brace G' to the bar H', nearer the tongue, and said bars H H' also adjusted with reference to the cross-straps K K'.

For three-horse equalizer, for all purposes except tongue, leave out the parts designated in Fig. 2 and pivot the equalizing-bars H H' at the points $i\ i$ (see Fig. 3) to the main evener B.

The manner in which the draft is distributed to obtain the desired result is as follows: The draft is sent back from outside single-trees, J J', through straps I I', to equalizing-bars H H', thence along said bars to the points where they are pivoted to the long and short bars D D', being nearly one-third their length, leaving two-thirds of their length, with the adjusting-holes at the ends of said bars and levers, to decide or portion amount of draft to each outside horse, when, in connection with bar L, cross-levers K K' conduct draft from center single-tree, $J^2$, to opposite inner ends of bars H H', and thence to the pivotal points of said bars, so that about one-half the draft from the middle horse merges with the draft of each outside horse, and any difference in draft attempted by either of the horses can be overcome by a variation in the position of the inner ends of the levers D D', bar L, and cross-levers K K', compelling inner end of one lever and diagonally-opposite end of bar L, by one of the cross-levers, forward, and the inner end of the other lever, with opposite end of bar L through the other cross-lever, backward, but tending for one lever to equalize variation of the other, and *contra*, thus compelling equalized draft from the pivotal points of the equalizing-bars, so that one and one-half horse's draft is applied each side of the tongue, and thence to the points $m$ $m'$ $m^2$ on the tongue in several ways: On two-horse side of lever D, draft-leverage to counteract side draft naturally, by reason of two horses obtaining power of draft on one side of tongue and one horse his power on the other side. The draft-leverage is back from inner end of lever D, via brace, E to point $m$ on tongue, across center bar, C, to brace E', and thence to point $m^2$ forward on tongue, and only one and one-half horse's power used, assisted on one-horse side of tongue by one and one-half horse's power in draft forward from inner end of lever D', via brace E', to point $m^2$ on tongue, with leverage via center cross-bar, C, and backward, via brace E, to point $m$ on tongue, all stayed by strap-braces F F', with strap-braces G G', to conduct draft to main evener B at the ends thereof, and thence to point $m$ on tongue.

It will thus be observed that the equalized draft of three horses can be applied on either side of the tongue, as may be necessary, side draft prevented on wagons, planters, &c., and side draft counteracted on harvesters, reapers, &c., where it is in the construction of the machines, also on such machines where one horse only is used on each side of the tongue, by the use of the device shown in Fig. 2.

Having thus fully described my invention, what I claim as new, and desire to secure by Letters Patent, is—

1. The combination, with the main evener B and equalizing-bars H H', of the intermediate connecting mechanism, consisting of the long and short levers D D', cross-bar C, strap-braces F F' G G', and diagonal braces E E', substantially as and for the purpose herein shown and described.

2. The combination, in a three-horse equalizer, of the single-trees J J' J², levers I I', plate or bar L, cross-levers K K', equalizing-bars H H', long and short levers D D', cross-bar C, strap-braces F F' G G', diagonal braces E E', main evener B, and tongue A, the several parts arranged relatively to each other and adapted to be adjusted substantially in the manner as and for the purposes herein shown and described.

FRANKLIN MARSH.

Witnesses:
  O. C. G. PHILLIPS,
  T. G. PHILLIPS.